United States Patent
Paielli et al.

(10) Patent No.: US 11,396,215 B2
(45) Date of Patent: Jul. 26, 2022

(54) SYSTEM AND METHOD FOR RIDE HEIGHT ESTIMATION

(71) Applicant: Dana Automotive Systems Group, LLC, Maumee, OH (US)

(72) Inventors: Perry M. Paielli, Sand Creek, MI (US); Scott R. Green, Maumee, OH (US)

(73) Assignee: Dana Automotive Systems Group, LLC, Maumee, OH (US)

(*) Notice: Subject to any disclaimer, the term of this patent is extended or adjusted under 35 U.S.C. 154(b) by 241 days.

(21) Appl. No.: 16/904,360

(22) Filed: Jun. 17, 2020

(65) Prior Publication Data

US 2021/0394574 A1 Dec. 23, 2021

(51) Int. Cl.
| | |
|---|---|
| *B60G 17/018* | (2006.01) |
| *B60G 17/019* | (2006.01) |
| *G01D 5/20* | (2006.01) |
| *B60B 35/12* | (2006.01) |
| *B60G 17/017* | (2006.01) |
| *B60G 11/27* | (2006.01) |

(52) U.S. Cl.
CPC ........ *B60G 17/0182* (2013.01); *B60B 35/122* (2013.01); *B60G 17/017* (2013.01); *B60G 17/019* (2013.01); *G01D 5/2013* (2013.01); *G01D 5/2046* (2013.01); *B60G 11/27* (2013.01); *B60G 2202/152* (2013.01); *B60G 2400/252* (2013.01); *B60G 2400/60* (2013.01); *B60G 2401/11* (2013.01); *B60G 2500/30* (2013.01)

(58) Field of Classification Search
CPC .............. B60G 17/0182; B60G 17/019; B60G 2400/252; B60G 2500/30
See application file for complete search history.

(56) References Cited

U.S. PATENT DOCUMENTS

| | | | |
|---|---|---|---|
| 7,469,175 B2 | 12/2008 | Brandt et al. | |
| 2003/0197337 A1* | 10/2003 | Dodd | B60G 17/01933 280/5.508 |
| 2008/0054537 A1* | 3/2008 | Harrison | B60G 17/016 280/124.16 |

FOREIGN PATENT DOCUMENTS

| | | | | |
|---|---|---|---|---|
| CA | 2756470 A1 | * | 5/2012 | ........... B60G 17/019 |
| CN | 201660018 U | * | 12/2010 | |
| CN | 113799569 A | * | 12/2021 | ........... B60B 35/122 |
| DE | 3507426 A1 | * | 5/1984 | |
| EP | 2208624 A2 | * | 7/2010 | ......... B60G 17/0155 |
| GB | 2343160 A | * | 5/2000 | ............... B60G 3/20 |
| JP | 2019098882 A | * | 6/2019 | ......... B60G 17/0155 |
| WO | WO-2005032863 A1 | * | 4/2005 | ........... B60G 17/016 |

* cited by examiner

Primary Examiner — Karen Beck
(74) *Attorney, Agent, or Firm* — McCoy Russell LLP

(57) ABSTRACT

Methods and systems are provided for estimation of a ride height of a vehicle axle via a linear displacement sensor. In one example, a method may include, during motion of vehicle wheels, estimating a change in ride height of an axle based on a distance of axial movement between a first axle constant velocity universal (CV) joint and a differential unit.

20 Claims, 6 Drawing Sheets

SYSTEM AND METHOD FOR RIDE HEIGHT ESTIMATION

FIELD

The present description relates generally to methods and systems for estimation of a ride height of a vehicle axle via a linear displacement sensor.

BACKGROUND AND SUMMARY

Vehicles such as passenger cars may include a load-bearing framework, chassis, and axles supporting multiple wheels. A ride height for a vehicle axle may be a vertical distance between a wheel end of an axle and a lower surface of the chassis. During operation of a vehicle, relative movement of the chassis and consequent changes in ride height and center of gravity of the vehicle may be monitored via one or more sensors. Based on the measured ride height, adjustment may be carried out via a suspension system of the vehicle to maintain a desired ride height and center of gravity for improved vehicle stability, as just an example.

One example approach for estimation of ride height in a vehicle axle may include measuring a position of the vehicle chassis relative to the wheels based on a translation of linear position to angular position using a lever mechanism. The lever mechanism may include a lever arm affixed at one end to the vehicle chassis while the other end of the arm may be attached to an axle of a rotational angular displacement sensor.

The inventors herein have recognized potential issues with using a lever mechanism along with a rotational angular displacement sensor for estimation of ride height of a vehicle axle. As an example, the lever mechanism including the lever arm, the rotational angular displacement sensor, and the associated wiring may all be located at the wheel end of the axle. The wheel end of the axle may be subjected to harsh (on-road) conditions causing the lever mechanism to be susceptible to expedited mechanical degradation. Additional shock resistance and sensor sealing may be carried out to reduce degradation of the lever mechanism. Further, the mechanical translation mechanism between the lever arm and the rotational angular displacement sensor may add to the complexity and costs of the lever mechanism. Also, in order to measure the ride height using the lever mechanism, a considerable wiring is used at the wheel end of the axle which further adds to the cost and complexity of the system.

In one example, the issues described above may be addressed by a method for a vehicle, comprising: during motion of vehicle wheels, estimating a change in ride height of an axle based on a distance of axial movement between a first axle constant velocity universal (CV) joint and a differential. In this way, by estimating a change in axial length via a sensor, ride height may be estimated accurately with fewer components.

As one example, a linear displacement sensor may be coupled to a differential unit housed between two half-shaft of a vehicle axle. During movement of the vehicle, the distance between the wheel end and the chassis may change as the wheels may shift vertically at the wheel ends of the axle. A constant velocity universal (CV) joint may couple the differential to a wheel end via a half-shaft of the axle. Due to the wheel movement, an angular displacement of the half-shaft at the CV joint may be translated into a change in lateral distance between the CV joint and the differential unit. The linear displacement sensor may estimate distance of axial movement of the half-shaft. The change in the vertical distance between the wheel end the chassis (a change in ride height) may be estimated based on an initial linear distance between the CV joint and the wheel end and the axial movement between the CV joint and the wheel end during wheel movement. Based on the estimated ride height, the vehicle suspension system may adjust the ride height to maintain a desired position of the center of gravity of the vehicle.

In this way, by using a sensor coupled to the differential unit to detect a change in lateral distance between the differential unit and the CV joint during wheel movement, a ride height of an axle may be estimated without the use of a complex lever mechanism. By replacing the lever mechanism with a single linear displacement sensor, a significant amount of wiring required may be reduced. The technical effect of placing the linear displacement sensor at the CV joint proximal to the differential unit is that the sensor is not subjected to the robustness requirements of the wheel end, thereby reducing the sensor sealing and shock resistance requirements. By accurately estimating a ride height of the axle, adjustments may be carried out in a vehicle suspension system to maintain a desired center of gravity of the vehicle. Overall, by using a linear displacement sensor coupled to the differential unit to estimate the ride height during vehicle travel, degradation of the mechanism used for ride height estimation may be reduced and accuracy of measurement may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2, 3, and 5A-B are shown to scale, although other relative dimensions may be used, if desired.

DETAILED DESCRIPTION

Figure 1:
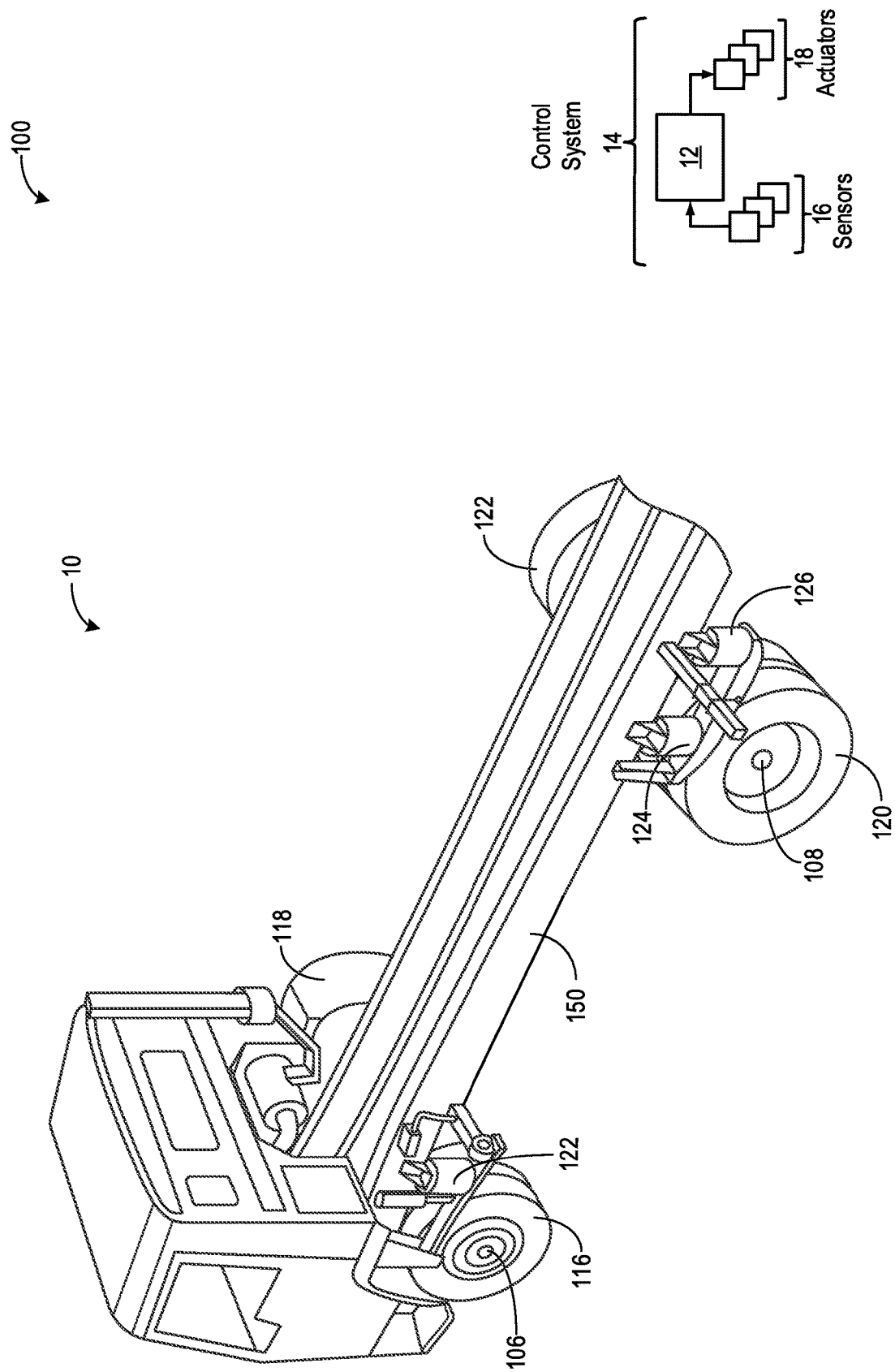
FIG. 1 shows a vehicle chassis with two axles.
Figure 2:
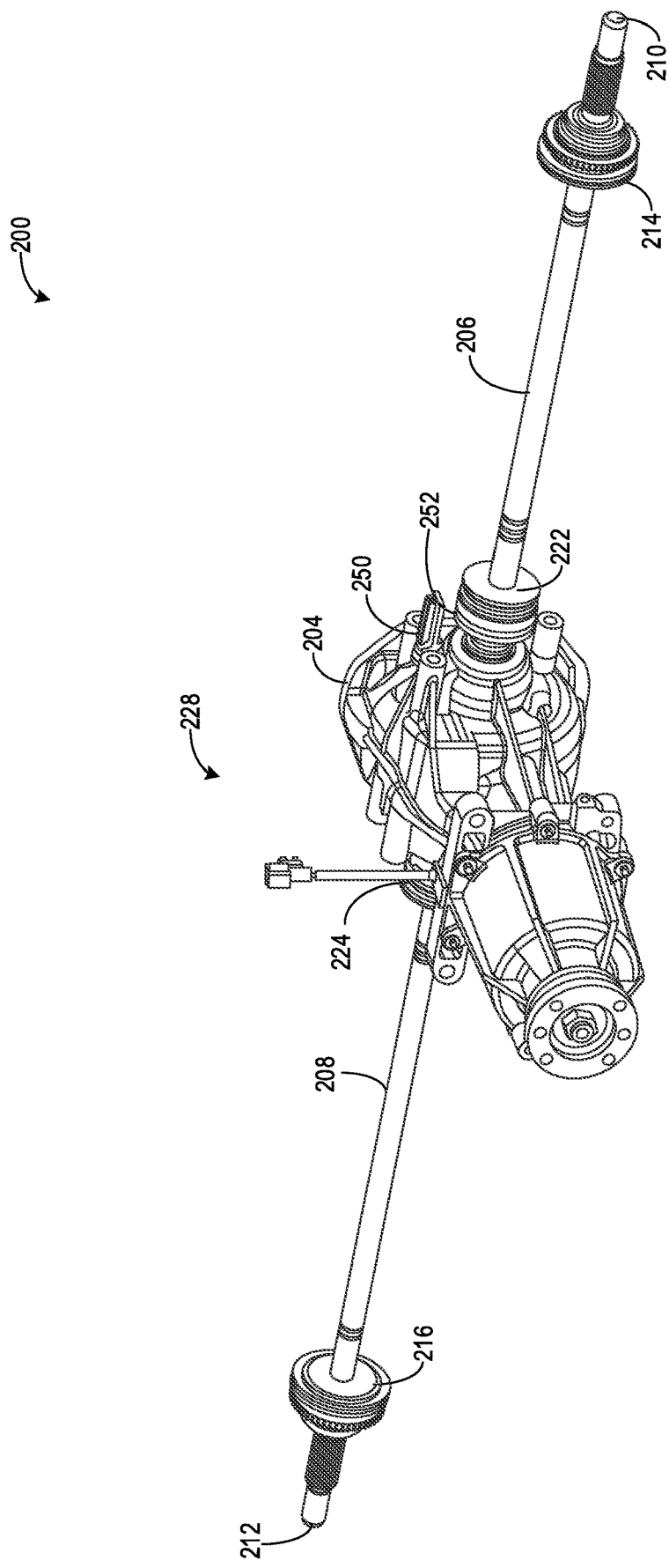
FIG. 2 shows an example positioning of a linear displacement sensor for ride height estimation.
Figure 3:
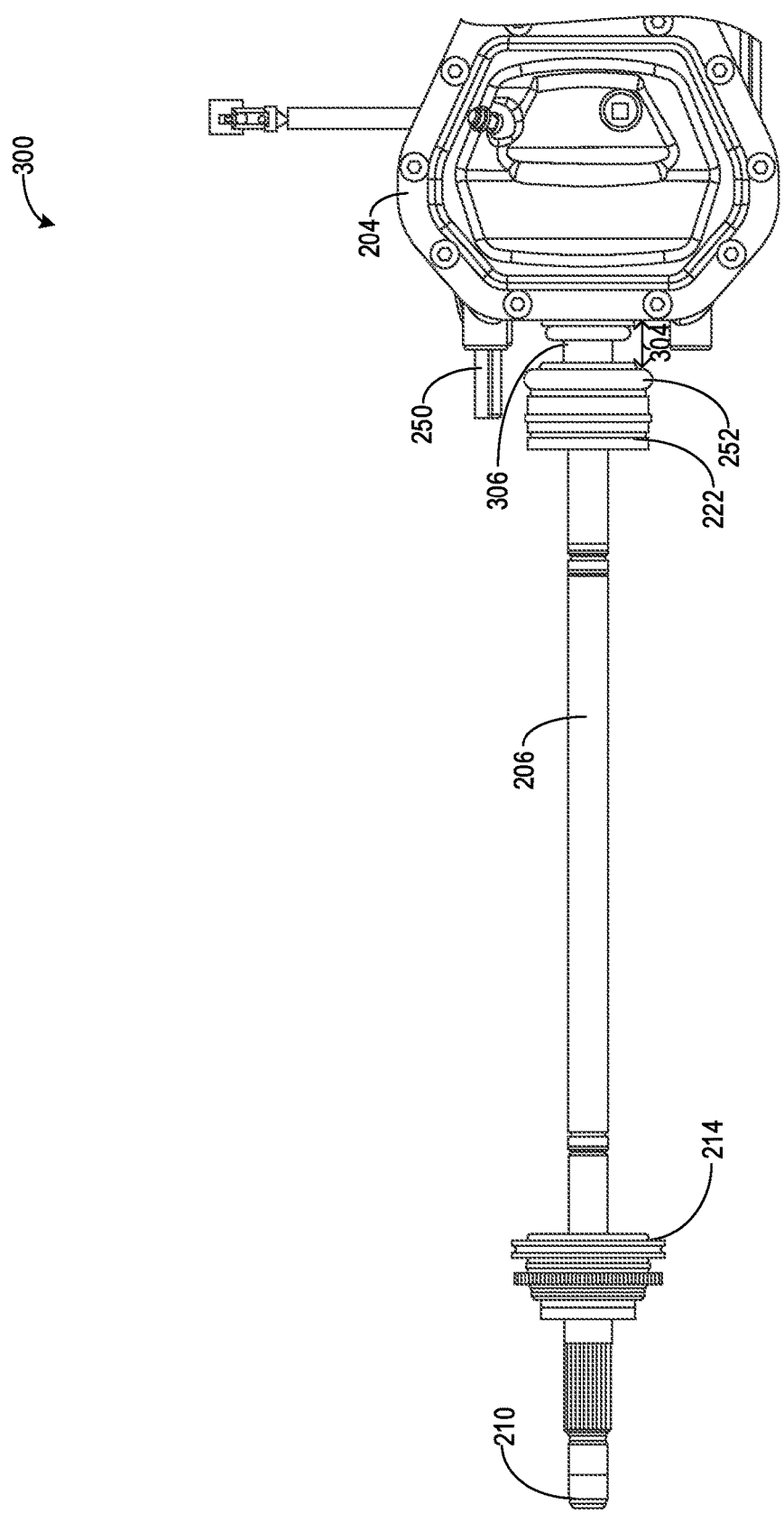
FIG. 3 shows another view of positioning of the linear displacement sensor.
Figure 4A:
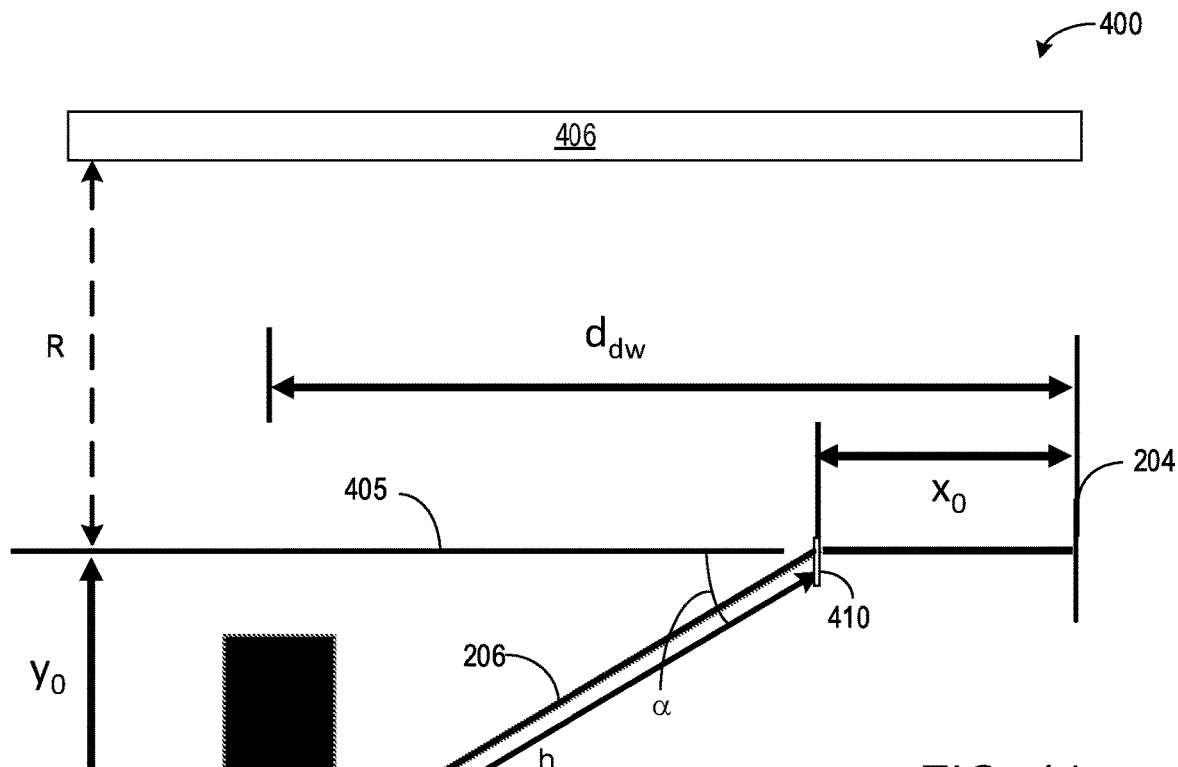
FIG. 4A shows a schematic of ride height estimation using the linear displacement sensor.
Figure 4B:
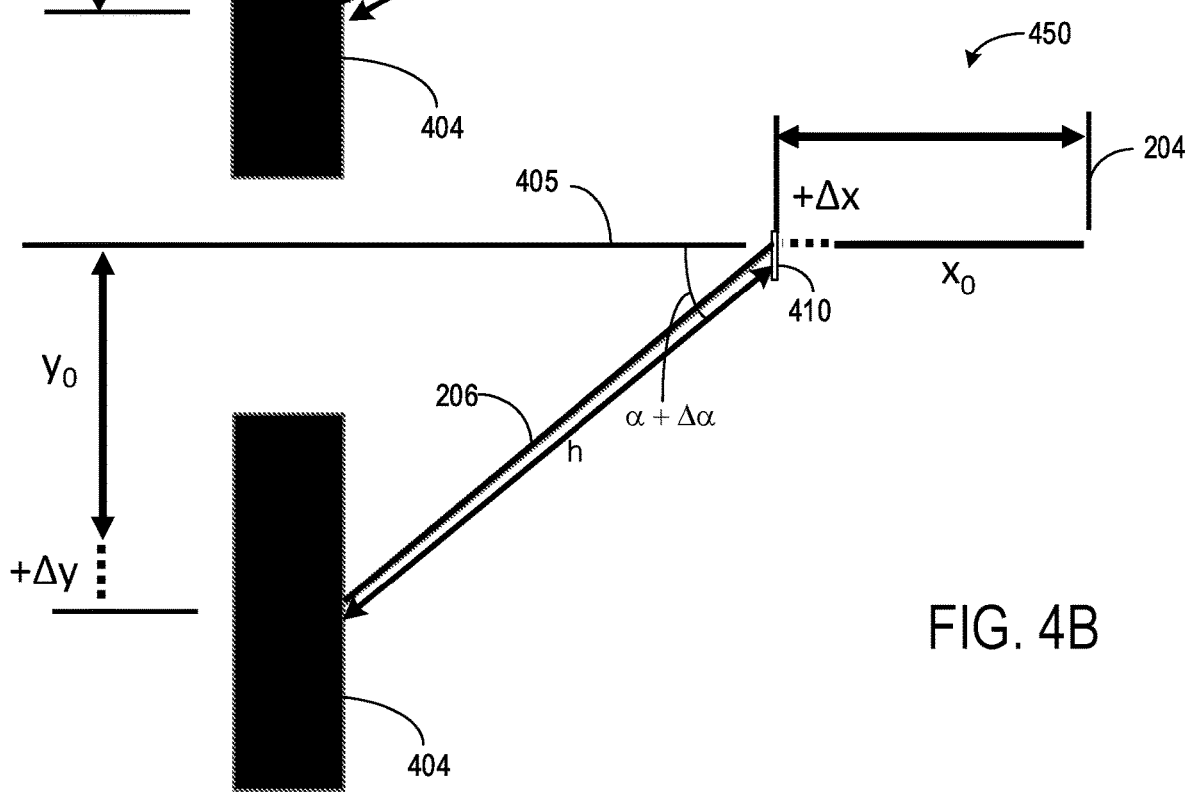
FIG. 4B shows a schematic of a change in half-shaft length during wheel travel.

The following description relates to systems and methods for estimation of a ride height of a vehicle via a linear displacement sensor. An example vehicle framework, chassis, including two axles is shown in FIG. 1. A linear displacement sensor, as shown in FIGS. 2 and 3, may be coupled to a differential unit of an axle to estimate a vertical distance (ride height) between a wheel end of an axle and a lower surface of the chassis. Structure of the linear displacement sensor is elaborated in FIGS. 5A-B. An example of ride height estimation is schematically depicted in FIGS. 4A-B. A vehicle controller may carry out a control routine, such as via the control routine of FIG. 6, to estimate a ride height of a vehicle axle during vehicle operation and then adjust the ride height based on the estimated ride height.

FIG. 1 shows an example embodiment 100 of a vehicle 10 including a chassis 150 and a two-axle powertrain. The chassis 150 may form the load-bearing frame for the vehicle 10. A front axle 106 may be coupled to a set of wheels 116 and 118 on two wheel ends while a rear axle 108 may be coupled to another set of wheels 120 and 122. Each of the front axle 106 and the rear axle 108 may be positioned directly below the chassis.

Each of the front axle 106 and the rear axle 108 may include a differential unit. As an example, the rear axle 108 may include a first differential unit. The first differential unit may be coupled to two half shafts via two inner constant velocity universal (CV) joints. The CV joints facilitate angular movement of the half-shafts relative to the differential while torque is being transferred from the differential to the half-shafts. Power may be transmitted from the differential unit to a half-shaft via a CV joint at a variable angle at constant rotation without appreciable increase in friction. A first end of a half-shaft may be coupled to the differential unit via an inner CV joint while a second end of the half-shaft may be the wheel end about which a wheel may be mounted. An outer CV joint may be coupled to the half-shaft proximal to the wheel end to allow a wider range of motion of the wheel while continuing supply of torque from the differential to the wheel end.

A suspension system such as an electronically controlled air suspension system may be included between the chassis and the axles, and a ride height such as a vertical distance between a wheel end of an axle and a lower surface of the chassis may be adjusted via the air suspension system. The suspension system may include air bellows, shock absorbers, and linkages for attaching the chassis to the axles. As an example, the front axle may be suspended via a first air bellow 122 while the rear axle may be suspended via a pair of air bellows, second air bellow 124 and a third air bellow 126. Each of the air bellows may be rubber bellows linked between the chassis and the wheel end of an axle. A solenoid actuated valve may be coupled to each air bellow to allow air to enter or exit the air bellow. When a solenoid is active, the associated valve may open to allow air from an air reservoir to enter or exit the respective air bellow via the valve. When a solenoid is inactive (at rest), the associated valve may be closed to close the associated valve and air bellow. In the closed position, air may not be transferred to or from the air bellow to the air reservoir. An air supply unit such as including a pump may supply ambient air to the reservoir.

The actual (final) vertical distance (referred to herein as ride height) between a lower surface of the chassis and a wheel end of an axle may be maintained within a first (higher) threshold height and second (lower) threshold height. By maintaining the actual distance within the first and second threshold heights, a center of gravity of the vehicle may be maintained within a threshold height range (from ground), thereby providing stability to the vehicle. The ride height of an axle may change due to loading of the vehicle and characteristics of a road on which the vehicle is travelling. The estimated ride height may also be used in variable/active damping control systems that vary damping in electronically controlled shock absorbers as a function of wheel end movement.

A linear displacement sensor may be coupled to a differential unit between two half-shafts to estimate a final ride height at a vehicle axle. During the wheel travel, a linear distance between a CV joint and a wheel end of a half-shaft may be estimated based on a distance of axial movement between the differential unit and the inner CV joint, an initial distance between plane of differential and wheel end and a length of the half-shaft. The distance of axial movement between the differential unit and the inner CV joint may be estimated via the linear displacement sensor positioned on the differential proximal to the CV joint, the linear displacement sensor facing the wheel end. An example axle with a linear displacement sensor is discussed in detail in FIGS. 2 and 3. A change in ride height may be estimated as a function of the axial movement between the CV joint and the differential unit. An initial ride height may be retrieved from a controller memory, the initial ride height being a vertical distance between the wheel end of the axle and a lower surface of a vehicle frame during the vehicle wheels at rest, and the change in ride height may be estimated relative to the initial ride height. A final ride height may be estimated based on the initial ride height and the estimated change in ride height.

The estimated final ride height may be compared to the first and second threshold heights, and if it is determined that the ride height is higher than the first threshold height or lower than the second threshold height, adjustments may be carried out in the vehicle suspensions system to maintain the ride height within the first and second threshold heights. As an example, if the ride height of the front axle 106 is lower than the second threshold height, the solenoid valve coupled to the first air bellow 122 may be activated to open the associated valve and allow air to enter the first air bellow 122. As the air pressure build up in the first bellow 122, linkages of the suspension system allows the chassis 150 to rise relative to the wheels 116 and 118 causing an increase in ride height until the ride height reaches the second threshold height. As another example, if the ride height of the front axle 106 is higher than the first threshold, the solenoid valve coupled to the first air bellow 122 may be activated to open the associated valve and draw out air from the first air bellow 122 until the ride height reaches the first threshold height. As the air pressure decreases in the first bellow 122, linkages of the suspension system allow the chassis 150 to lower relative to the wheels 116 and 118 causing a decrease in ride height. In this way, by accurately measuring the actual ride height of a vehicle axle and consequently adjusting the ride height based on the estimated ride height, a position of center of gravity of the vehicle may be maintained.

Vehicle 10 may further include control system 14. Control system 14 is shown receiving information from a plurality of on-board sensors 16 and sending control signals to a plurality of on-board actuators 18. As one example, sensors 16 may include a plurality of linear displacement sensors, pressure, temperature, air/fuel ratio, and composition sensors coupled to various locations in vehicle 102. In addition, sensors coupled to the exterior of the vehicle system such as rain sensor (windshield sensor) and temperature sensor may be used to estimate ambient conditions. One or more cameras may be coupled to the vehicle exterior and/or on the dashboard of the vehicle cabin to capture images of the road ahead of the vehicle.

The actuators 18 may include, for example, a plurality of valves such as solenoid valves, fuel injectors, throttle, spark plug, etc. The control system 14 may include a controller 12. The controller 12 may receive input data from the various sensors, process the input data, and trigger various actuators in response to the processed input data based on instruction or code programmed therein corresponding to one or more routines.

FIG. 2 shows a schematic 200 of an axle 228 of a vehicle including a linear displacement sensor 250 for ride height estimation. The axle 228 may be one of the front axle 106 or the rear axle 108 in FIG. 1. A differential unit 204 may be positioned at the center of the axle 228 with a first half-shaft 206 of the axle 228 on one side and a second half-shaft 208 of the axle 228 on another side. The axle 228 may be disconnected at the differential unit 204 with first ends of each of the two half-shafts 206 and 208 mechanically coupled to spider gears of the transmission unit via respective side gears. Drive torque from an engine and/or electric motor powering the vehicle may be delivered to the differential unit 204 for further transmission to the vehicle wheels via the half-shafts 206 and 208. FIG. 3 shows a schematic 300 of the first half-shaft 208 of the axle 228 coupled to the differential unit 204.

A first end of a first half-shaft 206 may be coupled to the differential unit via a first inner constant velocity universal (CV) joint 222 while a second end of the half-shaft may be the first wheel end 210 about which a first wheel may be mounted. The first inner CV joint 222 allows angular movement of the first half-shaft 206 relative to the differential while torque is being transferred from the differential 204 to the first inner CV joint 222. A sliding spline 306 (as seen in FIG. 3) may be positioned between the first inner CV joint 222 and the differential 204 which may slide outward during conditions when the first half-shaft 206 may angle downwards. An outer CV joint 214 may be coupled to the half-shaft 206 proximal to the first wheel end 210 to allow a wider range of motion of the wheel while continuing supply of torque from the differential to the wheel end 210.

Similarly, a first end of a second half-shaft 208 may be coupled to the differential unit via a second inner constant velocity universal (CV) joint 224 while a second end of the second half-shaft may be the second wheel end 212 about which a second wheel may be mounted. The second inner CV joint 224 allows angular movement of the second half-shaft 208 relative to the differential while torque is being transferred from the differential 204 to the second inner CV joint 224. Another sliding spline may be positioned between the second inner CV joint 224 and the differential 204 which may slide outward during conditions when the first half-shaft 206 may angle downwards. A second outer CV joint 216 may be coupled to the second half-shaft 208 proximal to the second wheel end 212 to allow a wider range of motion of the wheel while continuing supply of torque from the differential to the wheel end 212.

A linear displacement sensor 250 may be positioned on a side of the differential 204 proximal to the first inner CV joint 222 and facing the first wheel end 210. In one example, the linear displacement sensor 250 may be positioned at the interface of the first inner CV joint 222 and the differential unit 204. The linear displacement sensor 250 may be integrated into the housing of the differential unit 204. The sensor 250 may also be mounted on a transfer case or any other assembly that acts to maintain the end point/hinge of the first half-shaft 206. The linear displacement sensor 250 may be configured to measure an axial movement of a sensor target 252 proximal to first inner CV joint 222.

In one example, the linear displacement sensor 250 may be an inductive sensor, in which a primary inductive coil generates eddy currents in a nearby electrically-conductive sensor target, and the position of this sensor target affects the self-inductance of the primary coil or the electromagnetic coupling factor between the primary inductive coil and one or more secondary inductive coils. When more than one secondary coil is used, the ratio of the coupling factors between the primary and each secondary coil can improve noise rejection and reduce cross-sensitivity to stray electromagnetic fields. As an example, the sensor target 252 may be shaped as a ring co-axial with the axle, and positioned proximal to the first inner CV joint 222.

In one example, as seen in FIG. 3, the linear displacement sensor 250 coupled to the differential unit 204 may be placed vertically above the sensor target 252. The sensor target 252 may be a ring formed on the circumference of a portion of the first inner CV joint 222 at the junction of the CV joint with the spline 306. As the spline 306 positioned between the first inner CV joint 222 and the differential 204 slides in and out, the distance between the differential 204 and the sensor target 252 may change. The axial movement of the spline 306 is shown by the arrow 304. The linear displacement sensor 250 immediately above the sensor target 252 may track the axial movement of the sensor target 252.

In another example, the linear displacement sensor 250 may be a magnetic sensor, in which the position of a magnetic target affects the output of the sensor. In another example, the linear displacement sensor 250 may be an optical sensor, in which the position of a reflective target affects the output of the sensor.

When the vehicle is non-operational (wheels not in motion), an initial lateral distance between an inner CV joint and a wheel end may be a pre-calibrated constant. As an example, this at rest (initial) lateral distance (h) between the inner CV joint and the wheel end may be calibrated at a factory or at a service station and stored in the controller memory. The lateral distance (h) between the inner CV joint and the wheel end is a length of the half-shaft as estimated from the CV joint facing the wheel end. When the vehicle is stationary (wheels not in motion) and the vehicle is unloaded (without added weight from passenger and/or cargo), an initial ride height such as the vertical distance between a wheel end of an axle and a lower surface of the chassis may be a pre-calibrated constant. As an example, this at rest ride height (R) may be calibrated at a factory or at a service station and stored in the controller memory.

The first wheel and the second wheel may rotate and slide side-ways about the fixed respective wheel end. As a wheel moves side-ways about the wheel end of the axle, the inner CV joint may angulate in one direction (say counterclockwise) while the outer CV joint may angulate in an opposite direction (say clockwise) and an angular displacement of the half-shaft may be observed. The presence of the splines at the inner CV joint allows the angular motion of the half-axle while continuing to transmit torque from the differential to the wheel end. As the splines slide outward, the angular displacement of the half-shaft at the CV joint may be translated into a change in lateral distance between the inner CV joint and the wheel end. The distance of sliding of the splines denoting the axial movement between the CV joint and the differential unit (4x) may be sensed using the linear displacement sensor 250 positioned on a side of the differential 204 proximal to the first inner CV joint 222 facing the first wheel end 210. The linear displacement sensor 250 may detect a change in the axial distance between the inner CV joint and the differential unit along the axle caused by the sliding out of the splines. Due to the change in the axial distance between the inner CV joint and the wheel end, the distance between the wheel end and the chassis (ride height) may change. A change in ride height may be further based on a previously estimated ride height such as an initial vertical distance ($y_0$) between a plane of the differential and wheel end at the wheel end. When the wheel is fixed, the vertical distance between the plane of the differential and wheel end (at the wheel end) may be zero. The change in ride height may be estimated based on the a distance of axial movement ($\Delta x$) between the differential unit and the inner CV joint, length of the half-shaft (h) as estimated from the CV joint, and the initial vertical distance ($y_0$) between a plane of the differential and wheel end at the wheel end.

FIG. 4A shows a schematic 400 of ride height estimation using the linear displacement sensor 250 of FIG. 3. Ride height between a lower surface of a chassis 406 of the vehicle and a wheel end of an axis coupled to a wheel 404 positioned directly below the chassis 306 may be estimated.

FIG. 3B shows a shows a schematic 450 of axial movement between the differential unit 204 and the inner CV joint. A sliding spline may be positioned between the inner CV joint and the differential unit 204. The spline may be slidable at one end towards the CV joint.

A horizontal distance between the differential 204 and the wheel 404, as denoted by claw, may remain constant with any change in ride height. An at rest vertical distance between a lower surface of a load-bearing framework such as the chassis 306 and a plane 405 of the differential may be denoted by R. The plane 405 may include the differential and the axle including the wheel end when the vehicle is at rest without any wheel movement. R is the at rest ride height calibrated when the vehicle is not in motion (wheels stationary) and without significant loading of the vehicle (significant loading including such as more than 10% of the vehicle's weight). The magnitude of R may be a constant that is calibrated at a factory or at a service station and stored in the controller memory.

An initial axial distance between the differential and the first sensor target (at the CV joint) may be depicted as xo. The axial distance between the CV joint and the wheel 404 may be the length of the half-shaft 206 coupling the inner CV joint (proximal to the differential), as depicted by h. The magnitude of h may be a constant that is calibrated at a factory or at a service station and stored in the controller memory.

During movement of the wheel 404, the vertical distance between the plane 405 and the wheel end may change. Movement of the wheel 404, may cause an angular shift in the first half-shaft. The Initial angle between the plane 405 and the half shaft 208 at an onset of a ride height change estimation is $\alpha$. In one example, a may be in the range of 3 to 6 degrees. An initial vertical distance ($y_0$) between the plane 405 of the differential and wheel end at the wheel end may be retrieved at the onset of a ride height change estimation. The initial vertical distance ($y_0$) may be retrieved from controller memory as an immediately previously estimated ride height. When the wheel is fixed, the vertical distance between the plane of the of the differential and wheel end at the wheel end may be zero.

During movement of the wheel 404, the distance between the differential and the wheel end may change. Movement of the wheel 404 may cause an angular shift in the half-shaft 206. The updated angle between the plane 405 and the updated position of the half shaft 208 is $\alpha+\Delta\alpha$. In one example, $\Delta\alpha$ may be in the range of 3 to 6 degrees. During the wheel movement, the spline between the differential 204 and the sensor target 410 may slide out as the half-axle slides down. The distance the spline slides outward to allow angled movement of the half-shaft is depicted by $\Delta x$. Due to the sliding of the spline, the distance of axial movement of the half-shaft may be $\Delta x$. As the spline slides towards the CV joint, the sensor target 410 is moved by $\Delta x$. The axial movement, $\Delta x$, of the sensor target 410 may be sensed by the sensor.

Due to the wheel movement, there may be change in the vertical distance between the plane 405 and the wheel end of the wheel 314 causing a change in the ride height. The change in ride height, as depicted by $y_0$, is the distance between the initial vertical distance between the plane 405 and the wheel 404 at the onset of the estimation, as depicted by y and the final, estimated vertical distance between the plane 405 and the wheel 404. The initial vertical distance between the plane 405 and the wheel 404 at the onset of the estimation may be the vertical distance between the plane 405 and the wheel 404 as estimated during an immediately previous ride height estimation and stored in the controller memory.

The change in ride height, as depicted by $\Delta y$, may be estimated based on a distance of axial movement between the differential unit and the inner CV joint, depicted by $\Delta x$, and the initial distance between plane of differential and wheel end, depicted by $y_0$, and a length of the half-shaft, depicted by h. The mathematical relationship between the distance of axial movement between the differential unit and the inner CV joint and the change in ride height is given by equation 1.

$$\Delta x = \sqrt{h_2 - y_0^2} - \sqrt{h^2 - (y_0 + \Delta y)^2} \quad (1)$$

In an alternate embodiment, instead of a linear displacement sensor measuring the distance of axial movement between he CV joint and the differential unit, a change in angular displacement ($\Delta\alpha$) between the initial position of the half-shaft 206 and the updated position of the half-shaft 206 may be sensed and the magnitude of the change in ride height, $\Delta y$ may be estimated as a function of $\Delta\alpha$.

The final ride height of the axle may be estimated as a function of the at rest ride height, R, the initial distance between the plane of differential and wheel end, depicted by $y_0$, and the estimated change in the vertical distance, $\Delta y$. In one example, during wheel movement, the final ride height of the axle 228 may be a summation of R, y, and $\Delta y$. Based on road conditions such as terrain, slope, and distribution of load on a vehicle, the final ride height may be different for multiple axles of the same vehicle.

In this way, the components of FIGS. 1-4 A, B enable a system for a vehicle, comprising: a controller with computer-readable instruction stored on non-transitory memory thereof that when executed enable the controller to: estimate a change in ride height of a vehicle axle relative to an initial ride height based on one or more of an estimated axial movement between a differential unit and a constant velocity universal (CV) joint coupling a half-shaft of the vehicle axle to the differential unit, an initial vertical distance between a plane of the differential unit and a wheel end, and a length of the half-shaft, the axial movement between a differential unit and the CV joint estimated via a linear displacement sensor coupled to the differential.

Figure 5A:
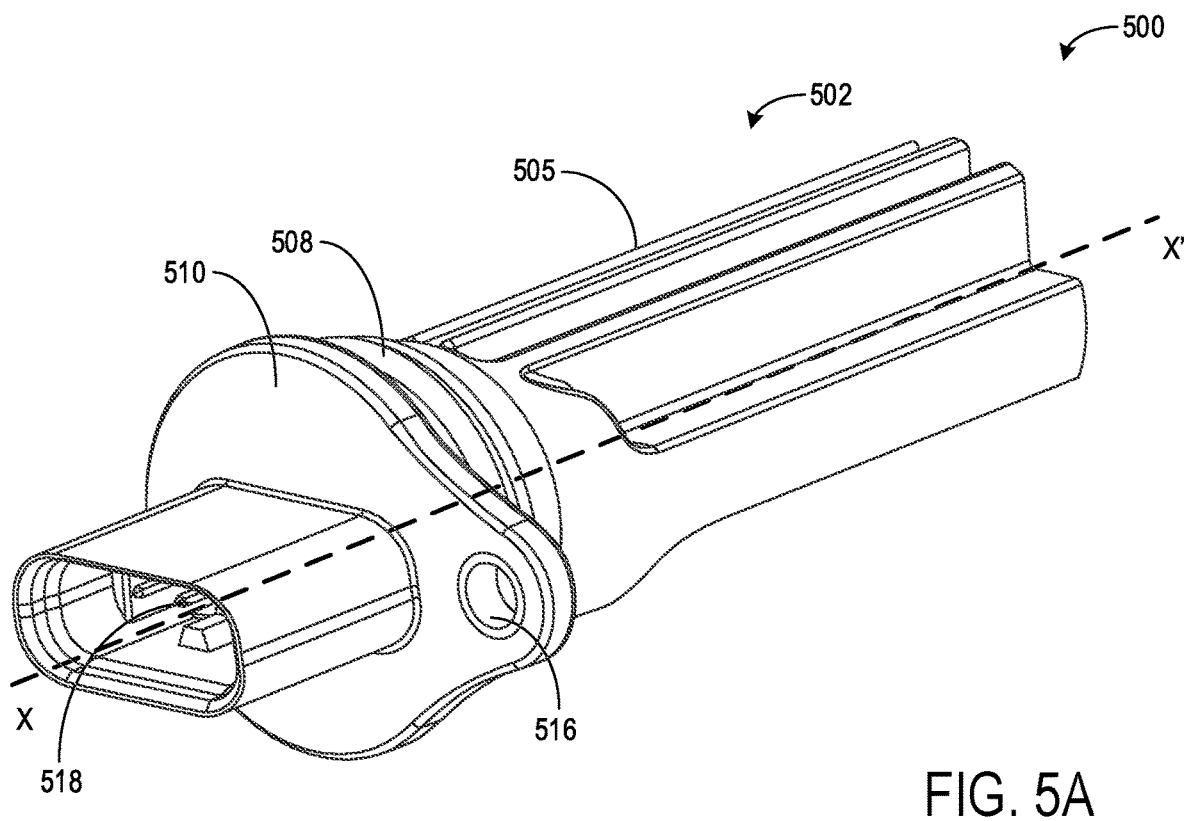
FIG. 5A shows a perspective view of the linear displacement sensor.
Figure 5B:
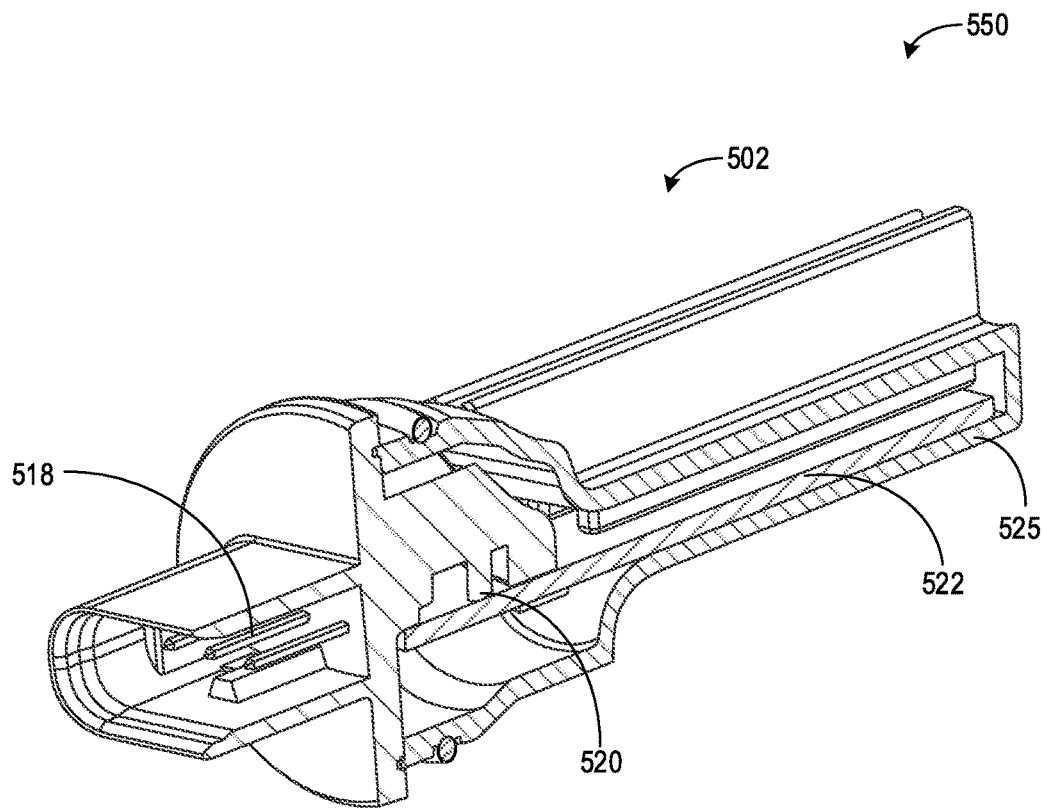
FIG. 5B shows a cross-section of the linear displacement sensor.
Figure 6:
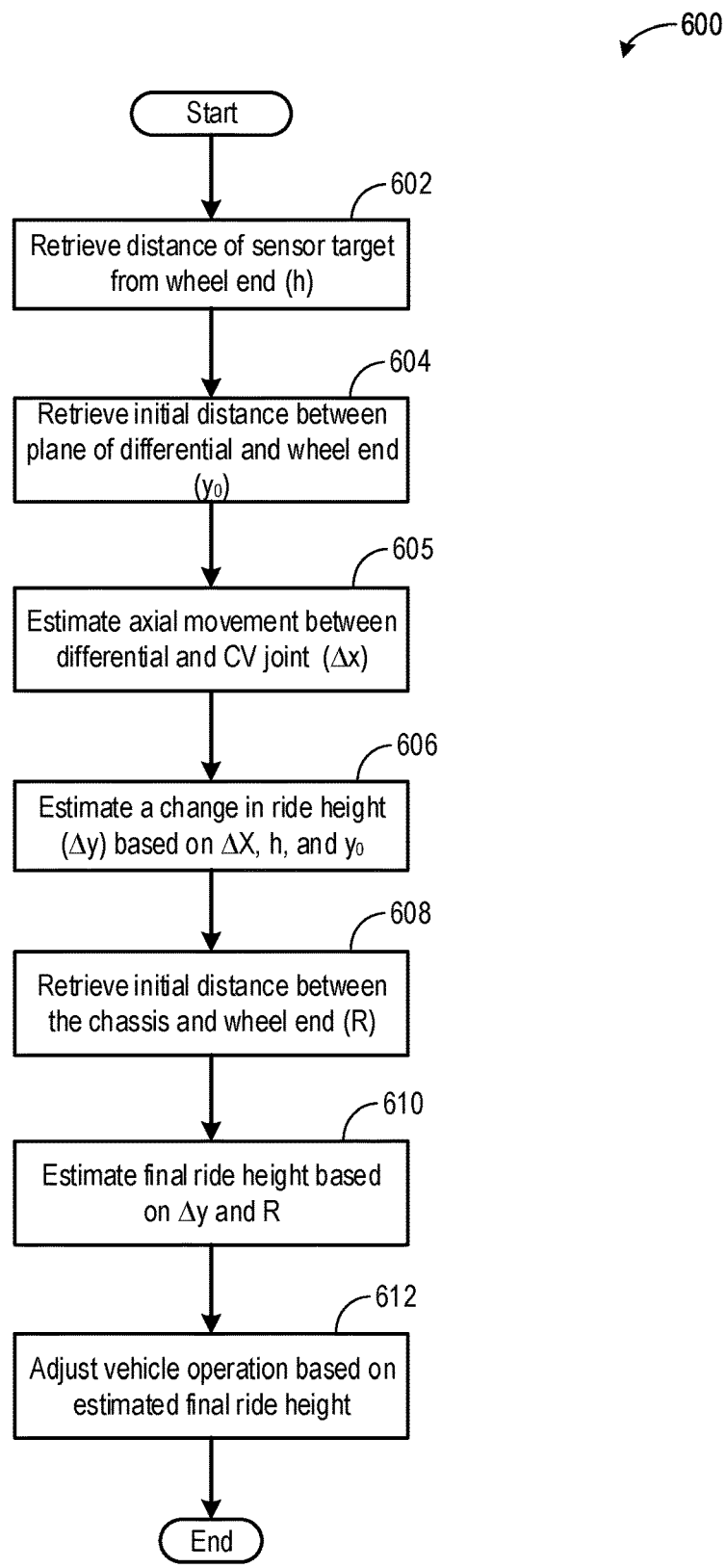
FIG. 6 shows a flow-chart illustrating an example method for estimating a ride height of a vehicle axle during vehicle operation.

FIG. 5A shows a perspective view 500 of a linear displacement sensor 502 used for estimating axial movement of a sliding spline positioned between a differential and an inner CV joint coupled to a half-shaft of an axle. FIG. 5B shows a cross-sectional view 550 of the linear displacement sensor 502. In one example the linear displacement sensor 502 may be the linear displacement sensor 250 in FIGS. 2-3.

The sensor 502 may include a housing 505 and a mounting head 510. The housing may be formed from two pieces laser welded together. Each piece may be individually molded from polymers. The mounting head 510 may include a fastener hole 516 at one side to mount the sensor to an external surface of an engine component such as the casing of a differential unit. An O-ring 508 may be used to seal the sensor onto the casing of the engine component. A four pin connector 518 according to specifications of United States Council for Automotive Research (USCAR) may be coupled to an end of the mounting head 510. The sensor may have a major diameter in a range of 22-27 mm. The sensor may track movement of a target along its length.

The sensor 502 may include a Printed Circuit Board Assembly (PCBA) 522 proximal to but not contacting a lower surface 525 of the housing 505. By separating the PCBA from the housing, thermal expansion compensation issues may be reduced. The PCBA may be supported via one or more heat-staked anchors 520 of the mounting head 510. The pins of the pin connector 518 may be soldered into the PCBA after the PCBA is heat-staked. The sensor 502 may be communicably connected to the engine controller. A primary coil is used within the sensor 502 to generate an alternating current (AC) magnetic field. The magnetic field may couple onto two secondary coils generating voltage. A metallic target (such as the sensor target 252 in FIGS. 2-3) may disturb the generated magnetic field. The secondary coils may receive different voltages corresponding to positions of the target. The position of the target may then be estimated as a ratio of the two secondary coil voltages.

FIG. 5 shows an example method 500 for estimating a ride height of a vehicle axle during vehicle operation. Ride height may be a distance between a lower surface of a chassis and a wheel end of an axle. Instructions for carrying out method 500 and the rest of the methods included herein may be executed by a controller based on instructions stored on a memory of the controller and in conjunction with signals received from sensors of the engine system, such as the sensors described above with reference to FIG. 1. The controller may employ engine actuators of the vehicle system to adjust engine operation, according to the methods described below.

At 602, a distance (h) between a sensor target (such as sensor target 252 in FIG. 2) being tracked by a linear displacement sensor (such as linear displacement sensor 250 in FIG. 2) and a wheel end may be retrieved. The distance between the sensor target and the wheel end may be the length of a half-shaft (such as first half-shaft 206 in FIG. 2) of the axle estimated from the CV joint coupling the half shaft to the differential. The length of the half-shaft of the axle may be a constant value that may be measured at an assembly plant or service station and stored in the controller memory. The distance between the sensor target and the wheel end may be retrieved from controller memory.

At 604, an initial vertical distance ($y_0$) between a plane of the differential and the wheel end may be retrieved from the controller memory. The plane may include the differential and the axle including the wheel end when the vehicle is at rest without any wheel movement. In one example, the initial distance $y_0$ may be the immediately previously measured change in ride height during wheel movement, as stored in the controller memory. As an example, when the wheel is fixed, the vertical distance between the plane of the of the differential and wheel end at the wheel end may be zero as the wheel end may be co-planer with the differential.

At 605, an axial movement ($\Delta x$) between the differential and the CV joint may be estimated via the linear position sensor coupled to or integrated into the differential. During wheel travel, the wheels may shift vertically at the wheel ends of the axle and a distance between the differential and wheel end of the half-shaft may change. A sliding spline (such as spline 306 in FIG. 3) may be positioned between the inner CV joint and the differential, and the spline may slide towards the wheel end during conditions when the half-shaft may angle downwards due to wheel movement. The linear displacement sensor may be placed vertically above the sensor target which may form a ring at the junction of the spline and the CV joint. As the spline slides in and out, the distance between the differential and the sensor target may change. The linear displacement sensor placed immediately above the sensor target may track the axial movement of the sensor target.

At 606, a change in ride height ($\Delta y$) relative to the initial vertical distance ($y_0$) between a plane of the differential and the wheel end may be estimated based on the retrieved distance (h) of sensor target from the wheel end, the retrieved initial vertical distance ($y_0$) between a plane of the differential and the wheel end, and the estimated axial movement ($\Delta x$) between the differential and the CV joint. Due angular movement of the wheel attached to the wheel end of the half-shaft, there may be change in the vertical distance between the lower surface of the chassis and the wheel end of the wheel causing a change in the ride height. The change in the ride height ($\Delta y$) may be a function of h, $y_0$, and $\Delta x$ as given by equation 1.

At 608, an at rest distance (at rest height, R) between a lower surface of the chassis and the wheel end of the half shaft during vehicle rest may be retrieved from the controller memory. When the vehicle is non-operation such as wheels are stationary, and the vehicle is unloaded (without added weight from passenger and/or cargo), an at rest ride height such as the vertical distance between a wheel end of the axle and a lower surface of the chassis may be measured at a factory or at a service station and stored in the controller memory. The at rest vertical distance between a lower surface of a load-bearing framework such as the chassis and the plane of the differential may be denoted by R.

At 610, the final ride height of the vehicle axle may be estimated based on the estimated change in ride height ($\Delta y$), the initial distance between the plane of the differential and wheel end, and the at rest ride height (R). In one example, during wheel movement to one side, the final ride height of the axle may be a summation of R, y, and $\Delta y$. In another example, during wheel movement to another side, the final ride height of the axle may be a difference between $\Delta y$ and y summed to R.

In an example where the ride height is being estimated in real-time during vehicle motion along a surface with imperfections, there may be noise in the measured value. In an example, a filtered value may be used where the determined right height is filtered with a low-pass filter to provide a filtered ride height. In some examples, the unfiltered, or differently filtered (e.g., with a high-pass filter relative to the low pass filter) values may also be used to actually detect road bump height, uneven surfaces, etc. In this way, based on vehicle speed data in combination with the ride height data, the system can detect road surface geometry which can also be used to adjust vehicle stability and/or traction control operation. Such detection can be particularly advantageous using the linear displacement at a CV joint in this way as such data can be less sensitive to vehicle mass motion and disturbances, and thus more accurate information is possible leading to more accurate vehicle traction control and/or stability control.

At 612, vehicle operation may be adjusted based on the estimated final ride height. As an example, vehicle actuators may be adjusted to change the ride height of the vehicle such that the ride height may be maintained within a desired range. It may be desired to maintain the ride height with a first threshold height and second threshold height. By maintaining the actual distance within the first and second threshold heights, a center of gravity of the vehicle may be maintained at a desired height (relative to ground), thereby providing stability to the vehicle. The ride height of an axle may change due to loading of the vehicle and characteristics of a road on which the vehicle is travelling.

The estimated final ride height may be compared to each of the first and second threshold heights. If the final ride height is outside the range of the first and second threshold heights, the ride height of the vehicle axle may be carried out by adjusting a suspension system such as an electronically controlled air suspension system included between the chassis and the axle. If it is determined that the estimated, final ride height of the front axle is lower than the second threshold, the controller may send a signal to an actuator of a solenoid valve of an air bellow of the suspension system coupled to the axle to activate the solenoid and open the associated valve and allow air to enter the air bellow. As the air pressure build up in the air bellow, linkages of the suspension system allows the chassis to rise relative to the axle causing an increase in ride height until the second threshold height is reached. Upon the ride height reaching the second threshold height, the controller may send a signal to the actuator of the solenoid valve to deactivate the solenoid and close the valve. Air supply to the air bellow may also be suspended. If it is determined that the estimated, final ride height of the front axle is higher than the second threshold, the controller may send a signal to the actuator of the solenoid valve of the air bellow of the suspension system coupled to the axle to activate the solenoid and to open the associated valve and allow air to exit the air bellow. As the air pressure decreases in the air bellow, linkages of the suspension system allows the chassis to be lowered relative to the axle causing a decrease in ride height until the first threshold height is reached. Upon the ride height reaching the first threshold height, the controller may send a signal to the actuator of the solenoid valve to deactivate the solenoid and close the valve such that the remaining air pressure may be maintained within the bellow.

In this way, during wheel travel, a linear distance between a wheel end of a half-shaft and a constant velocity universal (CV) joint coupling the half-shaft to a differential unit may be estimated, a combined length of the half-shaft and the CV joint may be retrieved from a controller memory, and a change in a vertical distance between the wheel end and a vehicle chassis may be estimated as a function of the estimated linear distance and the retrieved combined length.

In one example, a method for a vehicle, comprises: during motion of vehicle wheels, estimating a change in ride height of an axle based on a distance of axial movement between a first axle constant velocity universal (CV) joint and a differential. In the preceding example, additionally or optionally, the axle includes a first half-shaft mechanically coupled to a differential at one end via the first CV joint, and a second half-shaft mechanically coupled to the differential at one end via a second CV joint, the differential positioned between the first half-shaft and the second half-shaft. In any or all of the preceding examples, additionally or optionally, the first half-shaft includes the wheel end about which a first wheel is attached, the wheel end opposite to the end coupled to the first CV joint. In any or all of the preceding examples, additionally or optionally, the distance of axial movement is estimated via a linear displacement sensor positioned on the differential proximal to the first CV joint, the linear displacement sensor facing the wheel end. In any or all of the preceding examples, additionally or optionally, estimating the change in ride height is further based on a length of the first half-shaft estimated from the first CV joint. In any or all of the preceding examples, additionally or optionally, estimating the change in ride height is further based on an initial vertical distance between a plane of the differential and the wheel end at an onset of the estimating the change in ride height, the change in ride height estimated relative to the initial vertical distance between the plane of the differential and the wheel end. In any or all of the preceding examples, the method further comprising, additionally or optionally, retrieving an at rest ride height from a controller memory, the at rest ride height being a vertical distance between the wheel end of the axle and a lower surface of a vehicle frame during the vehicle wheels at rest. In any or all of the preceding examples, the method further comprising, additionally or optionally, estimating a final ride height based on the at rest ride height, the initial vertical distance between the plane of the differential and the wheel end, and the estimated change in ride height. In any or all of the preceding examples, the method further comprising, additionally or optionally, in response to the final ride height being higher than a first threshold height, adjusting a suspension system of the vehicle to decrease the final ride height of the axle to between the first threshold height and a second threshold height. In any or all of the preceding examples, the method further comprising, additionally or optionally, in response to the final ride height lower than the second threshold height, adjusting the suspension system of the vehicle to increase the final ride height of the axle to between the first threshold height and the second threshold height, the first threshold height higher than the second threshold height.

Another example method for a vehicle comprises: during wheel travel, estimating a axial movement between a differential unit and a constant velocity universal (CV) joint coupling a half-shaft to the differential unit, retrieving a length of the half-shaft, and estimating a change in a vertical distance between a wheel end and a vehicle chassis as a function of the estimated linear distance and the retrieved combined length. In any preceding example, additionally or optionally, the estimating of the linear distance between the wheel end and the CV joint is based on a feedback from a linear displacement sensor attached to or integrated into the differential unit facing the wheel end. In any or all of the preceding examples, additionally or optionally, the combined length of the half-shaft and the CV joint is retrieved from a memory of an electronic controller, the combined length being a constant. In any or all of the preceding examples, additionally or optionally, the linear position sensor is an inductive sensor, a magnetic sensor, or an optical sensor. In any or all of the preceding examples, additionally or optionally, the change in a vertical distance between the wheel end and a vehicle chassis is further based on an initial vertical distance between a plane of the differential unit and the wheel end at an onset of the estimating the change in the vertical distance. In any or all of the preceding examples, additionally or optionally, initial vertical distance between the plane of the differential unit and the wheel end is estimated during a previous estimation of the vertical distance between the wheel end and the vehicle chassis and then retrieved from a memory of a controller.

In yet another example, a system for a vehicle, comprises: a controller with computer-readable instruction stored on non-transitory memory thereof that when executed enable the controller to: estimate a change in ride height of a vehicle axle relative to an initial ride height based on one or more of an estimated axial movement between a differential unit and a constant velocity universal (CV) joint coupling a half-shaft of the vehicle axle to the differential unit, an initial vertical distance between a plane of the differential unit and a wheel end, and a length of the half-shaft, the axial movement between a differential unit and the CV joint estimated via a linear displacement sensor coupled to the differential. In any preceding example, additionally or optionally, the distance between the differential unit and the CV joint is estimated based on linear axial movement during vertical movement of a wheel mounted on the wheel end of the vehicle axle. In any or all of the preceding examples, additionally or optionally, the initial ride height is a vertical distance between a lower surface of a vehicle framework and the wheel end estimated with wheels coupled to the axle being in stationary position and in absence of vehicle load. In any or all of the preceding examples, additionally or optionally, wherein the linear displacement sensor tracks axial movement of a target positioned adjacent to the CV joint facing the wheel end.

FIGS. 2, 3, and 5A-B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
during motion of vehicle wheels,
estimating a change in ride height of an axle based on a distance of axial movement between a first axle constant velocity universal (CV) joint and a differential.

2. The method of claim 1, wherein the axle includes a first half-shaft mechanically coupled to the differential at one end via the first CV joint, and a second half-shaft mechanically coupled to the differential at one end via a second CV joint, the differential positioned between the first half-shaft and the second half-shaft.

3. The method of claim 2, wherein the first half-shaft includes the wheel end about which a first wheel is attached, the wheel end opposite to the end coupled to the first CV joint.

4. The method of claim 2, wherein the distance of axial movement is estimated via a linear displacement sensor positioned on the differential proximal to the first CV joint, the linear displacement sensor facing the wheel end.

5. The method of claim 2, wherein estimating the change in ride height is further based on a length of the first half-shaft estimated from the first CV joint.

6. The method of claim 5, wherein estimating the change in ride height is further based on an initial vertical distance between a plane of the differential and the wheel end at an onset of the estimating the change in ride height, the change in ride height estimated relative to the initial vertical distance between the plane of the differential and the wheel end.

7. The method of claim 1, further comprising, retrieving an at rest ride height from a controller memory, the at rest ride height being a vertical distance between the wheel end of the axle and a lower surface of a vehicle frame during the vehicle wheels at rest.

8. The method of claim 7, further comprising, estimating a final ride height based on the at rest ride height, the initial vertical distance between the plane of the differential and the wheel end, and the estimated change in ride height.

9. The method of claim 8, further comprising, in response to the final ride height being higher than a first threshold height, adjusting a suspension system of the vehicle to decrease the final ride height of the axle to between the first threshold height and a second threshold height.

10. The method of claim 8, further comprising, in response to the final ride height lower than the second threshold height, adjusting the suspension system of the vehicle to increase the final ride height of the axle to between the first threshold height and the second threshold height, the first threshold height higher than the second threshold height.

11. A method for a vehicle, comprising:
during wheel travel, estimating a axial movement between a differential unit and a constant velocity universal (CV) joint coupling a half-shaft to the differential unit;
retrieving a length of the half-shaft; and
estimating a change in a vertical distance between a wheel end and a vehicle chassis as a function of the estimated linear distance and the retrieved combined length.

12. The method of claim 11, wherein the estimating the linear distance between the wheel end and the CV joint is based on a feedback from a linear displacement sensor attached to or integrated into the differential unit facing the wheel end.

13. The method of claim 11, wherein the combined length of the half-shaft and the CV joint is retrieved from a memory of an electronic controller, the combined length being a constant.

14. The method of claim 11, wherein the linear position sensor is an inductive sensor.

15. The method of claim 11, wherein the change in a vertical distance between the wheel end and a vehicle chassis is further based on an initial vertical distance between a plane of the differential unit and the wheel end at an onset of the estimating the change in the vertical distance.

16. The method of claim 11, wherein the initial vertical distance between the plane of the differential unit and the wheel end is estimated during a previous estimation of the vertical distance between the wheel end and the vehicle chassis and then retrieved from a memory of a controller.

17. A system for a vehicle, comprising:
a controller with computer-readable instruction stored on non-transitory memory thereof that when executed enable the controller to:
estimate a change in ride height of a vehicle axle relative to an initial ride height based on one or more of an estimated axial movement between a differential unit and a constant velocity universal (CV) joint coupling a half-shaft of the vehicle axle to the differential unit, an initial vertical distance between a plane of the differential unit and a wheel end, and a length of the half-shaft, the axial movement between a differential unit and the CV joint estimated via a linear displacement sensor coupled to the differential.

18. The system of claim 17, wherein the distance between the differential unit and the CV joint is estimated based on linear axial movement during vertical movement of a wheel mounted on the wheel end of the vehicle axle.

19. The system of claim 17, wherein the initial ride height is a vertical distance between a lower surface of a vehicle framework and the wheel end estimated with wheels coupled to the axle being in stationary position and in absence of vehicle load.

20. The system of claim 17, wherein the linear displacement sensor tracks axial movement of a target positioned adjacent to the CV joint facing the wheel end.

* * * * *